United States Patent
Younessian et al.

(10) Patent No.: US 12,374,113 B2
(45) Date of Patent: *Jul. 29, 2025

(54) SYSTEMS, METHODS, AND DEVICES FOR DETERMINING AN INTRODUCTION PORTION IN A VIDEO PROGRAM

(71) Applicant: Comcast Cable Communications, LLC, Philadelphia, PA (US)

(72) Inventors: Ehsan Younessian, Washington, DC (US); Faisal Ishtiaq, Plainfield, IL (US); Anthony Braskich, Kildeer, IL (US); Benjamin Spier, Silver Spring, MD (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,517

(22) Filed: Apr. 22, 2024

(65) Prior Publication Data

US 2024/0273903 A1    Aug. 15, 2024

Related U.S. Application Data

(63) Continuation of application No. 18/175,287, filed on Feb. 27, 2023, now Pat. No. 11,995,893, which is a
(Continued)

(51) Int. Cl.
*H04N 21/44* (2011.01)
*G06N 20/00* (2019.01)
(Continued)

(52) U.S. Cl.
CPC ............ *G06V 20/48* (2022.01); *G06N 20/00* (2019.01); *G06V 20/41* (2022.01);
(Continued)

(58) Field of Classification Search
None
See application file for complete search history.

(56) References Cited

U.S. PATENT DOCUMENTS

2017/0186141 A1    6/2017  Ha et al.
2022/0019809 A1    1/2022  Younessian et al.

OTHER PUBLICATIONS

US Patent Application filed Feb. 27, 2023, entitled "Systems, Methods, and Devices for Determining an Introduction Portion in a Video Program", U.S. Appl. No. 18/175,287.
(Continued)

*Primary Examiner* — Omar S Parra
(74) *Attorney, Agent, or Firm* — BakerHostetler

(57) ABSTRACT

Systems, methods, and devices relating to determining an introduction portion in a video program are described herein. A method may determine first and second hard-matching pairs of video segments in first and second video content such that video fingerprints of the first hard-matching pair match and video fingerprints of the second hard-matching pair also match. The method may classify a third pair of video segments in the first and second video content, sequentially between the first and second hard-matching pairs, as a soft-matching pair of video segments of an introduction portion. The method may use the classification of the third pair of video segments as a soft-matching pair to determine a model configured to determine that a pair of video segments in two video content items are a soft-matching pair of video segments of an introduction portion.

41 Claims, 8 Drawing Sheets

Related U.S. Application Data continuation of application No. 16/929,250, filed on Jul. 15, 2020, now Pat. No. 11,615,622.

(51) Int. Cl.
    *G06V 20/40*     (2022.01)
    *H04N 21/439*     (2011.01)
    *H04N 21/442*     (2011.01)
    *H04N 21/466*     (2011.01)

(52) U.S. Cl.
    CPC ... *H04N 21/4394* (2013.01); *H04N 21/44008* (2013.01); *H04N 21/442* (2013.01); *H04N 21/4665* (2013.01)

(56) References Cited

OTHER PUBLICATIONS

US Patent Application filed Jul. 15, 2020, entitled "Systems, Methods, and Devices for Determining an Introduction Portion in a Video Program", U.S. Appl. No. 16/929,250.

SYSTEMS, METHODS, AND DEVICES FOR DETERMINING AN INTRODUCTION PORTION IN A VIDEO PROGRAM

CROSS-REFERENCE TO RELATED APPLICATIONS

This application is a continuation of U.S. patent application Ser. No. 18/175,287, filed Feb. 27, 2023, now U.S. Pat. No. 11,995,893, issued May 28, 2024, which is a continuation of U.S. patent application Ser. No. 16/929,250, filed Jul. 15, 2020, now U.S. Pat. No. 11,615,622, issued Mar. 28, 2023, which are hereby incorporated by reference in their entirety.

BACKGROUND

Digital video has become the one of the most common video distribution channels in recent years. Digital video distribution may assume any of a number of forms, including digital cable, on-demand cable television service, digital video streaming, and digital video recorders (cloud or local). In addition to movies and other one-off programming, many viewers enjoy watching video series, such as episodes of a television series, via digital video distribution. And it is not uncommon for a viewer to watch multiple episodes of a television series in quick succession. Yet since the viewer has already just seen the introduction portion (e.g., title sequence and opening credits) of the television series in the previous episode, he or she may wish to skip this introduction portion and jump right to the main content of the episode.

For the viewer to skip the introduction portion, however, it typically must first be identified within the episode's video content. This presents a number of challenges. First, introduction portions may vary to some degree between episodes. For example, an episode may include a different director, different actors, or a guest host, resulting in slightly different opening credits. The compression techniques used to encode video content may also differ from episode to episode, which may result in inconsistent compression artifacts or other variations between episodes. Further, the sheer number of episodes that are broadcast or made available for digital distribution may hamper any sort of manual identification process, as will the time pressures to identify introduction portions in new episodes as quickly as possible. Moreover, identifying any particular segment within video content, including an introduction portion, may prove to be a computationally intense task.

These and other shortcomings are addressed in the present disclosure.

SUMMARY

Systems, methods, and devices relating to determining an introduction portion in a video program are described herein.

An introduction portion in target video content may be determined based on reference video content associated with the target video content. The target video content may comprise an episode of a television series and the reference video content may comprise a reference introduction portion associated with the television series, for example. A contiguous series of hard-matching (e.g., identical with respect to video fingerprint and length) pairs of video segments in the target and reference video content may be determined. The contiguous series of hard-matching pairs may comprise a first part of the introduction portion. The contiguous series of hard-matching pairs may be dilated by determining that one or more adjacent video segment pairs are soft-matching (e.g., not identical with respect to video fingerprint and/or length) video segments comprising a second part of the introduction portion. For example, the second part of the introduction portion may comprise a transition from the first part of the introduction portion to the main body of video content. The dilated, contiguous series of hard- and soft-matching video segment pairs may comprise the determined introduction portion in the target video content.

A soft-matching pair of video segments comprising at least part of an introduction portion may be determined via a model configured to receive an input of respective video fingerprints and lengths (and/or other characteristics) of a pair of video segments and output whether the pair of video segments comprise at least part of an introduction portion. The model may comprise a machine-learning model, such as a regressor, and may be trained based on pairs of video segments that are classified as soft-matching video segment pairs of an introduction portion. Such a video segment pair in first and second video content may be classified as part of the introduction portion by determining two hard-matching pairs of video segments in the first and second video content. One or more pairs of video segments that are sequentially between the two hard-matching pairs may be classified as soft-matching pairs comprising at least part of the introduction portion. In the context of training the machine learning model, the respective video fingerprints and lengths (and/or other characteristics) of the in-between pair of video segments may comprise a training data input and the classification of the in-between pair of video segments as soft-matching may comprise the corresponding training data output. In this manner, the training data for determining the model is automatically generated and labeled, rather than requiring a time-consuming manual labeling process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF DRAWINGS

The accompanying drawings, which are incorporated in and constitute a part of this specification, illustrate embodiments and together with the description, serve to explain the principles of the systems, methods, and devices.

Aspects of the disclosure will now be described in detail with reference to the drawings, wherein like reference numbers refer to like elements throughout, unless specified otherwise.

DETAILED DESCRIPTION

Figure 1:
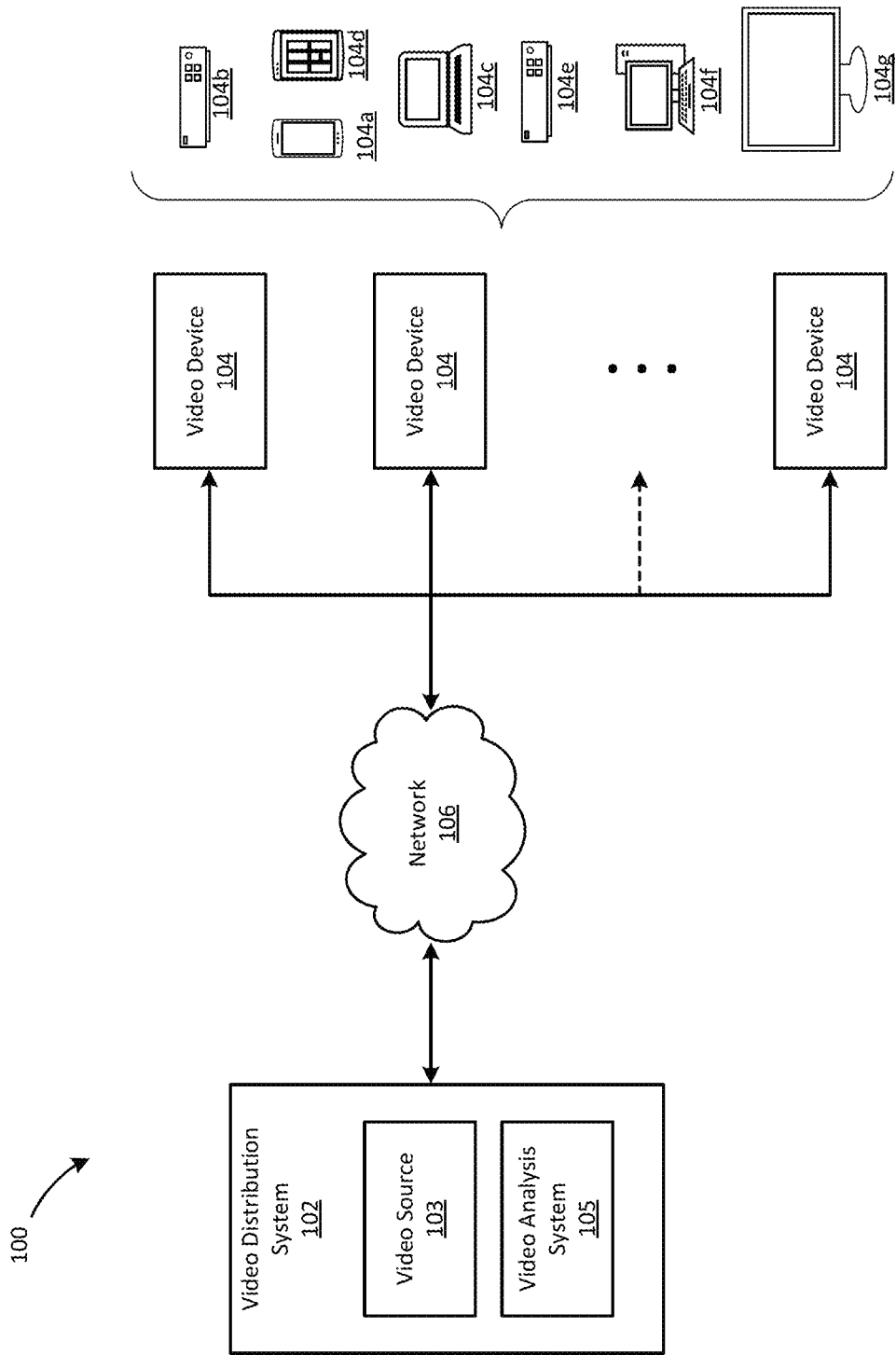
FIG. 1 is a block diagram of a system.

Systems, methods, and devices relating to determining an introduction portion in a video program are described. An introduction portion of a first video program (e.g., a target video program) may be determined by comparing the first video program, at least in part, to an associated second video program (e.g., a reference video program). The first and second video programs may both be episodes of the same television program series, for example. Additionally or alternatively, the second video program may comprise a stored reference introduction portion for the television program series. In comparing the first video program with the second video program, a contiguous series of one or more pairs of "hard-matching" video segments in the first and second video programs may be determined. The initial contiguous series of hard-matching video segment pairs may be iteratively dilated or expanded to include additional pairs of "soft-matching" video segments in the first and second video programs that are contiguous with or adjacent to the contiguous series of hard-matching video segment pairs. The resultant contiguous series of hard-matching and soft-matching video segments may comprise the introduction portion of the first (e.g., target) video program. This may be particularly useful for identifying those video segments of the introduction portion that are near the transition from the introduction portion to the main body of the video program.

A hard-matching pair of video segments may refer to a pair of video segments of the introduction portion in which the respective video fingerprints (or other type of fingerprint, such as an audio fingerprint) of the pair of video segments match one another and the difference in respective lengths of the pair of video segments is less than a threshold length (e.g., the lengths are the same). Because identifying a hard-matching pair of video segments mostly comprises direct numerical comparisons, this is typically a relatively quick process. By contrast, a soft-matching pair of video segments of the introduction portion may refer to a pair of video segments in which the respective video fingerprints of the pair of video segments do not match and/or the difference in respective lengths of the pair of video segments are greater than or equal to the length threshold. A pair of soft-matching video segments may comprise visually similar even identical to the naked eye-despite the fact that their video fingerprints and/or lengths do not match. For example, variations in video encoding processes or compression artifacts may cause a pair of video segments to have different video fingerprints. Because of such minor differences, a soft-matching pair may be more computationally expensive to determine than a hard-matching one. For example, determining that a pair of video segments are soft-matching may comprise performing video analyses on the pair of video segments and comparing the respective results to one another. The results of the video analyses may comprise one or more characteristics of the respective video segments and those characteristics may be compared to one another in determining that the video segment pair is soft-matching.

A model (e.g., a gradient boosting regressor or other type of machine learning model) may be used to determine that a pair of video segments are a soft-matching pair, i.e., the video segments of the pair form at least part of the introduction portion of an associated video program. For example, a target video segment (where it's status as part of the introduction portion is unknown) and a reference video segment (known to form part of the introduction portion) may be input to the model, and the model may return whether the target video segment is part of the introduction portion as a soft-matching pair. The model may similarly determine whether the target video segment and the reference video segment are a hard-matching pair.

The model for identifying an introduction portion in a video program may be determined based on analyzing video content "in the wild." For example, the model may be built based on a pool of video programs in which the introduction portion in a video program is not yet identified. The pool of video programs may additionally or alternatively comprise reference video programs (or portions thereof) in which the introduction portion is already known. When the model is implemented in a machine learning form, such video programs may serve as an unlabeled training data set for determining the model. In a labeled training data set, by contrast, the training data outputs for respective training data inputs are typically pre-defined before determining the machine learning model. For instance, the training data outputs may be manually set. Yet here, for example, two associated video programs (e.g., two episodes of the same television series)—one or more of which may be as-yet undistributed to the public—may be analyzed to determine one or more pairs of hard-matching video segments and/or one or more pairs of soft-matching video segments in the video programs. The hard-matching and/or soft-matching pairs may make up the introduction portion, at least in part, of the video programs. As described herein, the determined soft-matching pairs of video segments may be used to train or otherwise determine the model. The model so-trained may improve performance in determining any soft-matching video segments in target and reference video content that is at or near the boundary between the introduction portion and the main body video content.

In determining the model (e.g., a regressor), a pair of hard-matching video segments may be determined in sample video programs. One or more pairs of video segments that are sequentially between the pair of hard-matching video segments may be identified and classified as soft-matching video segment pair(s). The hard-matching video segment pairs and the in-between soft-matching video segment pairs may comprise part of, although not necessarily all of, the introduction portions of the video programs. For example, more than one set of two hard-matching pairs and corresponding in-between pairs may be identified in associated video programs. It is noted that the in-between pair(s) of video segments may not have been identified using a per se soft-matching algorithm or model. Indeed, one benefit realized by the instant disclosure is that the in-between video segment pairs may be classified as soft-matching for determining the model without having to undergo a typical computationally intense soft-matching process. With an in-between video segment pair being classified as soft-matching, the respective video fingerprints and lengths of the video segments may be used as training data input (e.g., a feature space or vector) for determining the model. The classification of the video segment pair as soft-matching may itself serve as the corresponding training data output. The model may be applied to a pair of video segments in other video programs (e.g., video programs of the same video program series) to determine that the pair is soft-matching and thus potentially part of the introduction portion of the video programs.

For example, one or more soft-matching pairs of video segments among a plurality of video content items may be determined. The plurality of video content items may comprise different episodes of one or more video programs. Each of the one or more soft-matching pairs of video segments may comprise a first video segment of one of the plurality of video content items and a second video segment of a different one of the plurality of video content items. The first video segment and the segment video segment of each soft-matching pair may be associated with two episodes of a same video program, for example. A characteristic of the first and second video segments of each soft-matching pair may not match. A characteristic of a video segment may include a video fingerprint, a length, audio elements, an audio fingerprint, closed captioning data, subtitle data, on-screen text, or a detected visual feature. Each of the one or more soft-matching pairs of video segments may be located within the corresponding video content items between hard-matching pairs of video segments of the video content items. A characteristic of a hard-matching pair of video segments may match. Based on the determining the one or more soft-matching pairs of video segments, a model may be determined. The model may be configured to determine that a pair of video segments comprises common video content (e.g., an introduction portion, a closing portion, or an advertisement)

FIG. 1 illustrates a block diagram of a system 100 in which the present systems, methods, and devices may be implemented. The system 100 comprises a video distribution system 102 and one or more video devices 104 configured to receive video content from a video source 103 of the video distribution system 102. The video devices 104 may receive the video content via a network 106. The video distribution system 102 may comprise a video analysis system 105 configured to identify duplicate or near-duplicate ("visually corresponding") video segments between various instances of video content. For example, the video analysis system 105 may determine an introduction portion of a new episode of a video program series based on the introduction portion of a previous episode of the video program series. During playback, a viewer may be given the option to skip the introduction portion in the new episode if he or she desires.

As used herein, a video program may refer generally to any video content produced for viewer consumption. A video program may comprise video content produced for broadcast via over-the-air radio, cable, satellite, or the internet. A video program may comprise video content produced for digital video streaming or video-on-demand. A video program may comprise a television show or program. A video program series may comprise two or more associated video programs. For example, a video program series may include an episodic or serial television series. As another example, a video program series may include a documentary series, such as a nature documentary series. As yet another example, a video program series may include a regularly-scheduled video program series, such as a nightly news program. Regardless of the type, format, genre, or delivery method of a video program series, a video program of the video program series may be referred to generally as an episode of the video program series.

An introduction portion as used herein may refer to a portion of a video program that is oftentimes the same as or similar to corresponding portions of at least some other video programs of the video program series. An introduction portion may include the opening title and/or credits for the video program series and/or the specific video program of the series. An introduction portion may also include the theme song for the video program series. Although the instant application is discussed primarily in terms of introduction portions, the techniques described herein are applicable to any duplicate or near-duplicate (e.g., common) video segments in video content, such as advertisements or the outgoing/closing portion (e.g., closing credits) of a video program.

A video device 104 may comprise any one of numerous types of devices configured to effectuate video playback and/or viewing. A video device 104 may comprise a display device, such as a television display 104g. A video device 104 may comprise a computing device, such as a laptop computer 104c or a desktop computer 104f. A video device 104 may comprise a mobile device, such as a smart phone 104a or a tablet computer 104d. A video device 104 may be configured to receive video content and output the video content to a separate display device for consumer viewing. For example, a video device 104 may comprise a set-top box 104e, such as a cable set-top box. A set-top box 104e may receive video content via a cable input (e.g., co-axial cable or fiber optic cable) and format the received video content for output to a display device. A set-top box 104e may receive video content via digital video streaming. A set-top box 104e (or other type of video device 104) may comprise a quadrature amplitude modulation (QAM) tuner. A set-top box 104e may comprise a digital media player or a gaming device.

A video device 104 may comprise a digital video recorder (DVR) 104b that receives and stores video content for later viewing. Other video devices 104 may also implement features that allow received video content to be stored on the device for later viewing. A video device 104 may be in communication with a cloud DVR system to receive video content. A video device 104 may combine any features or characteristics of the foregoing examples. For instance, a video device 104 may include a cable set-top box with integrated DVR features.

A video device 104 may be configured to receive viewer inputs relating to an introduction portion of a video program or other duplicate or near-duplicate video content. For example, a video device 104 may be configured to receive viewer input to select an on-screen option or prompt to skip an introduction portion of a video program. A video device 104 may be configured to receive viewer input to interact with on-screen advertisements or other interactive elements of video content.

The video distribution system 102 may generally effectuate video content delivery to the video devices 104. The video distribution system 102 may comprise a cable or satellite television provider system. A cable or satellite television provider system may deliver video content according to scheduled broadcast times and/or may implement video-on-demand services. The video distribution system 102 may comprise a digital video streaming system. The video distribution system 102 may implement a cloud-based DVR system configured to deliver "recorded" video content upon request from a video device 104.

The video distribution system 102 may comprise the video source 103. The video source 103 may provide (e.g., transmit or deliver) video content to the video devices 104. The video source 103 may comprise stored video content, such as that anticipated to be delivered as digital streaming video, on-demand video, or cloud DVR recorded video. The video source 103 may comprise video content intended for immediate or near-immediate broadcast, such as a live television video feed. For example, the video source 103 may comprise video content that has not yet been broadcast or made available for digital video streaming or on-demand video delivery. The video source 103 may comprise backhaul video content. The video source 103 may comprise stored reference introduction portions without the remainder portions of the respective video programs.

The video analysis system 105 may generally implement video analysis techniques relating to duplicate or near-duplicate video content (e.g., an introduction portion) between two or more instances of associated video content. The video analysis system 105 may base such analysis on video content at the video source 103, such as stored video content (e.g., for digital video streaming or on-demand delivery) or video content that is being delivered or soon will be delivered to video devices 104 (e.g., broadcast video programming). The video analysis system 105 may determine, based on reference video content, the video segments of target video content that comprises the introduction portion of the target video content. Such a determination may be accomplished via a model (e.g., a machine learning model) that is configured to identify a portion of first video content (target video content) that visually corresponds to a portion of second video content (reference video content).

The network 106 may comprise a private portion. The network 106 may comprise a public portion, such as the Internet. The network 106 may comprise a content distribution and/or access network. The network 106 may comprise a cable television network. The network 106 may facilitate communication via one or more communication protocols. The network 106 may comprise fiber, cable, or a combination thereof. The network 106 may comprise wired links, wireless links, a combination thereof, and/or the like. The network 106 may comprise routers, switches, nodes, gateways, servers, modems, and/or the like.

Figure 2:
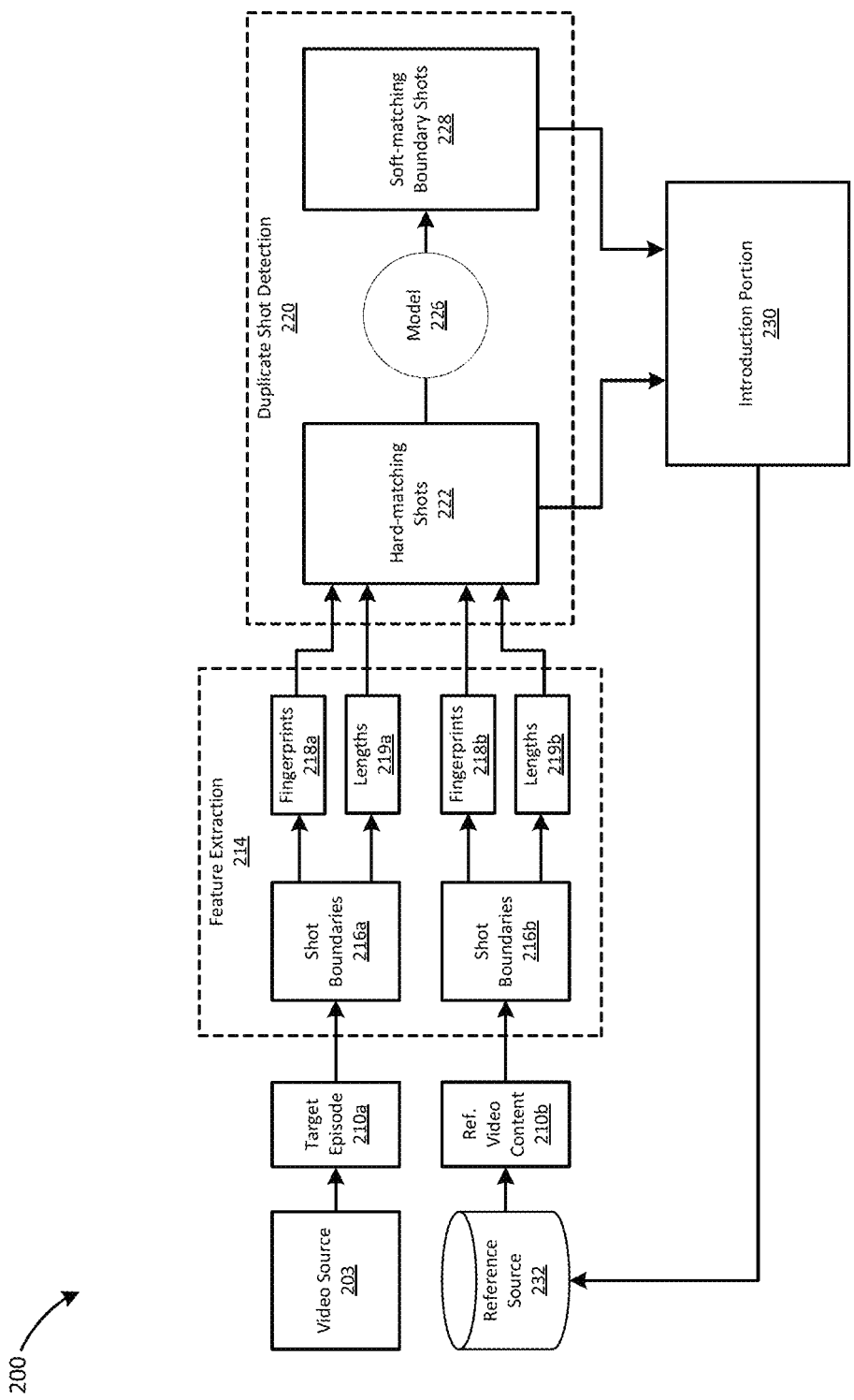
FIG. 2 is a diagram of an example data flow.

FIG. 2 illustrates a block diagram 200 of an example process to determine an introduction portion 230 of a target episode 210a based on associated reference video content 210b. The introduction portion 230 may be determined via a model 226. The model 226 may comprise the determined model 556 described in relation to FIG. 5 that is configured to determine if a shot in a first episode is a soft-match to a corresponding shot in a second episode. The introduction portion 230 may be determined by matching shots in the target episode 210a with shots in the reference video content 210b (via hard- and/or soft-matching). For example, a series of one or more hard-matching shots 222 may be determined in the target episode 210a. The introduction portion 230 may be determined by dilating the hard-matching shots 222 to include contiguous soft-matching boundary shots 228.

The target episode 210a may be received from a video source 203. The video source 203 may be the same as or similar to, in at least some aspects, the video source 103 of FIG. 1. The target episode 210a may comprise an episode that has not yet been broadcast or made available for digital video streaming or on-demand delivery. The target episode 210a may comprise a "new" episode of a video program series.

The reference video content 210b may be received from a reference source 232. The reference video content 210b may be associated with the target episode 210a via a common video program series. The reference video content 210b may be a full episode of the video program series, a portion of an episode of the video program series, or an introduction portion associated with the video program series. Similarly, the reference source 232 may comprise one or more full episodes of various video program series, one or more partial episodes of various video program series, and/or one or more introduction portions associated with various video program series. In some instances, the introduction portion in the reference video content 210b may be already known. For example, the introduction portion in the reference video content 210b may be identified by a start time and an end time of the introduction portion within the reference video content 210b. The video fingerprints and shot lengths in the reference video content 210b may be previously known as well. In other instances, the introduction portion in the reference video content 210b may not yet be identified. Yet by determining the hard- and/or soft-matching shots in the target episode 210a and the reference video content 210b, the introduction portion in the reference video content 210b may also be determined.

Feature extraction 214 may be performed on the target episode 210a and the reference video content 210b to determine the shot boundaries 216a,b, video fingerprints 218a,b, and shot lengths 219a,b of the target episode 210a and the reference video content 210b, respectively. If the shot boundaries 216b, video fingerprints 218b, and shot lengths 219b for the reference video content 210b are already known, this step may be bypassed for the reference video content 210b.

A video fingerprint 218a,b for a shot may comprise a video fingerprint for a single frame of the shot, such as the first frame of the shot. A video fingerprint 218a,b may comprise a block-level RGB (red-green-blue) descriptor of a frame. A video fingerprint 218a,b may comprise a CLD (color layer descriptor) of a frame. A video fingerprint 218a,b may comprise an alphanumeric value, such as a 10-digit hash of the CLD of the frame. Matching video fingerprints may comprise the same alphanumeric value. A length 219a,b of a shot may comprise a number of frames or a length in seconds. A video fingerprint 218a,b and a length 219a,b of a shot may be expressed as an ordered pair of the 10-digit hash and length (in seconds) of the shot (e.g., (1123234325, 2.6543)).

A shot boundary 216a,b may refer to a substantial change in video content from one moment of an episode to the next. A shot may refer to a cinematic shot or scene. For example, a shot may comprise a series of interrelated consecutive frames taken by a single camera and representing a continuous action in time and space. A shot boundary 216a,b may comprise a transition or cut from an outdoor scene to an indoor scene or a switch from one camera angle to another. A shot boundary 216a,b may comprise a hard cut or a soft cut. A shot boundary 216a,b may be determined by detecting a threshold change in video content over a pre-defined period of time or number of frames. For example, shot boundary detection may analyze changes in respective dominant colors in portions of successive frames.

In the duplicate shot detection 220, one or more hard-matching shots 222 may be determined based on the video fingerprints 218a,b and the shot lengths 219a,b of the target episode 210a and the reference video content 210b, respectively. The hard-matching shots 222 may comprise one or more pairs of hard-matching shots. A hard-matching shot pair may comprise a shot in the target episode 210a and a shot in the reference video content 210b in which the video fingerprints 218a,b of the respective shots match and the difference between the shot lengths 219a,b of the respective shots is less than a pre-defined shot length threshold. The hard-matching shots 222 may comprise a contiguous series of hard-matching shot pairs. The contiguous hard-matching shots 222 in the target episode 210a may comprise part of the introduction portion in the target episode 210a. As such, the contiguous hard-matching shots 222 in the target episode 210a may form an initial series (e.g., an initial "core") of shots of the introduction portion. This contiguous series of introduction portion shots may be dilated or expanded, based on the model 226, to include adjacent soft-matching introduction portion shots.

One or more pairs of soft-matching boundary shots 228 (also referred to herein as simply "boundary shots 228") may be determined based on the hard-matching shots 222 (e.g., the contiguous series of hard-matching introduction portion shots) and the model 226. The model 226 may comprise a machine learning model, such as a gradient boosting regressor model or other type of supervised machine learning model. The model 226 may be configured to determine an introduction portion shot in the target episode 210a via determining a soft-match between the subject shot in the target episode 210a and the corresponding shot in the reference video content 210b. A soft-matching pair of shots of the boundary shots 228 may comprise a shot of the target episode 210a and a corresponding shot in the reference video content 210b in which the video fingerprints 218,b of the shots do not match and/or the difference between the shot lengths 219a,b of the shots is greater than a pre-defined shot length threshold. A pair of soft-matching video segments may be visually similar to one another, but not identical.

A pair of boundary shots 228 may refer to a pair of shots that are contiguous with one of the pairs of hard-matching shot 222 that form the initial hard-matching series of the introduction portion shots in the target episode 210a and reference video content 210b. To determine a pair of boundary shots 228, a pair of shots that are contiguous with a pair of the hard-matching shots 222 may be analyzed via the model 226 to determine that the target episode 210a shot of the pair is soft-matching with the corresponding reference video content 210b shot of the pair. To determine that the pair are soft-matching, the video fingerprint 218a and shot length 219a (and/or other shot characteristics) of the target episode 210a and the video fingerprint 218b and shot length 219b (and/or other shot characteristics) of the reference video content 210b shot may be input to the model 226. If the shots of the pair are determined as soft-matching, they may be considered a boundary shot pair of the boundary shots 228. That is, the target episode 210a shot of the pair may be considered part of the now-dilated introduction portion in the target episode 210a. The process may be repeated with other pairs of shots in the target episode 210a and reference video content 210b that are contiguous with a pair of hard-matching shots 222 or a pair of already-determined boundary shots 228. It is noted that a shot pair may be considered "contiguous" with a hard-matching pair via one or more intervening boundary shots 228, thus allowing continued dilation of the initial series of hard-matching shots of the introduction portion.

When no further hard-matching shots 222 or soft-matching boundary shots 228 may be determined (e.g., the series of introduction portion shots may not be further dilated), the sequence of hard-matching shots 222 and boundary shots 228 may together comprise the introduction portion 230. The introduction portion 230 may refer to the introduction portion in the target episode 210a and/or the reference video content 210b. The introduction portion 230 may be identified according to an identifier, a start time within the target episode 210a and/or reference video content 210b, and a stop time within the target episode 210a and/or reference video content 210b. The identifying information may be communicated to a video device so that the introduction portion 230 may be skipped during playback of the target episode 210a. For example, the introduction portion 230 may be identified via metadata sent to the video device along with the target episode 210a. The introduction portion 230 may be added to the reference source 232, such as for use in determining the introduction portion in other associated episodes.

Figure 3:
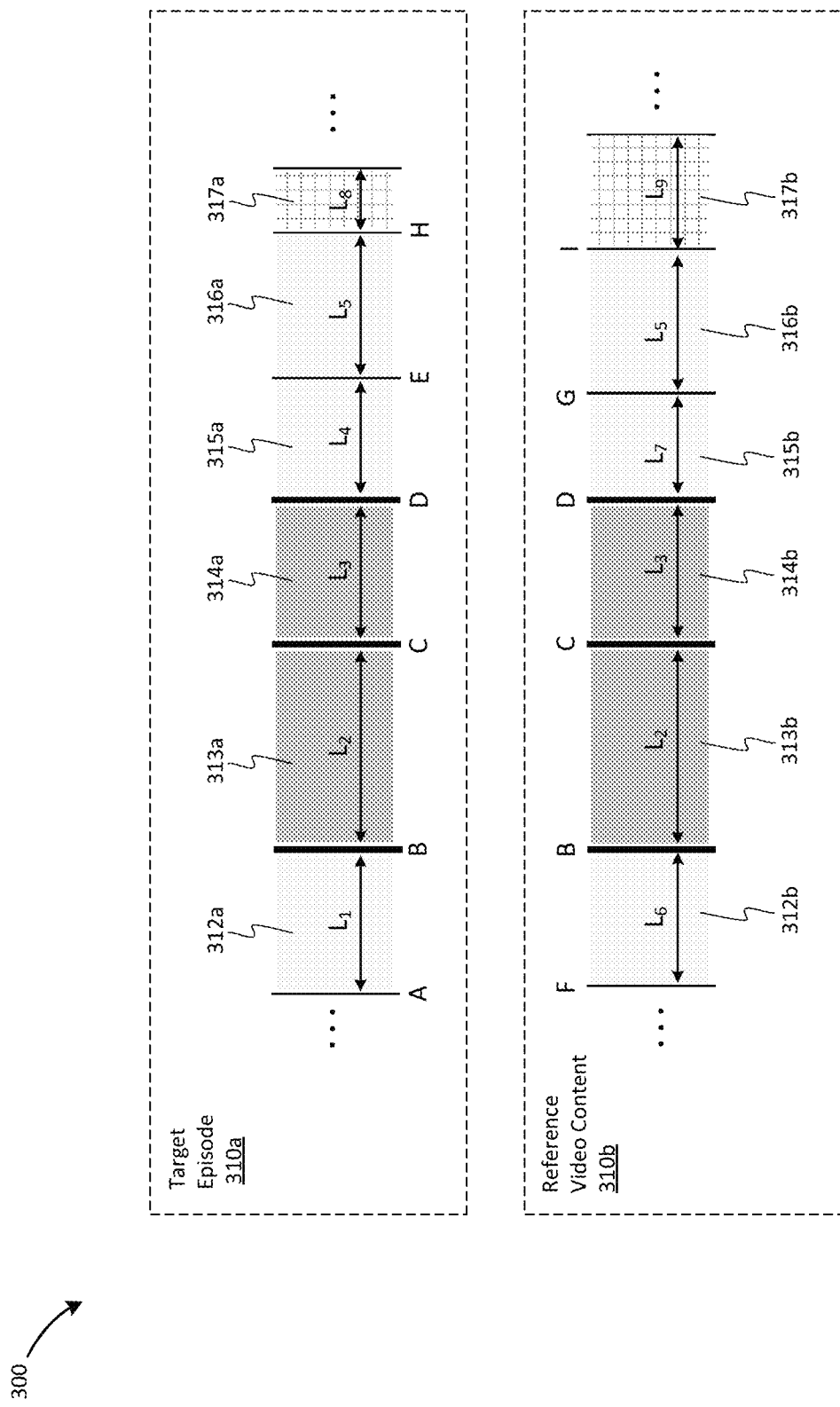
FIG. 3 is a diagram of an example video segment sequence.

FIG. 3 illustrates a diagram 300 of an example episode pair comprising a target episode 310a and reference video content 310b. The target episode 310a and the reference video content 310b may be associated with the same video program series. The target episode 310a and the reference video content 310b may be an example of the target episode 210a and the reference video content 210b in FIG. 2. The diagram 300 shall be used to illustrate an example of dilating the boundaries of hard-matching introduction portion shots by soft-matching contiguous boundary shots to determine a final introduction portion. It is noted that the diagram 300 is not necessarily to scale.

The target episode 310a comprises a plurality of shots 312a-317a and the reference video content 310b comprises a generally-corresponding plurality of shots 312b-317b. The shots are delineated by vertical bars, each with an alphabetic label (A, B, C, D, E, F, G, H, or I). An alphabetic label of a vertical bar indicates the video fingerprint for the shot just subsequent to the vertical bar. Matching video fingerprints are indicated by a bold vertical line and non-matching video fingerprints are indicated by a thin vertical line. For example, the shot 313a of the target episode 310a and the shot 313b of the reference video content 310b both have the same video fingerprint (B). Conversely, the shot 316a of the target episode 310a and the shot 316b of the reference video content 310b do not have the same video fingerprint (E and G, respectively). The double-arrowed horizontal lines and corresponding labels indicate the lengths of the shots. Where a pair of shots are labeled as having the same length, this may indicate that the difference between the shots' respective lengths is under or equal to a pre-defined shot length threshold. Similarly, reference to various lengths as "matching" or the like may indicate that the difference between the lengths is under or equal to the shot length threshold and reference to various lengths as "non-matching" or the like may indicate that the difference between the lengths exceeds the shot length threshold.

A series of one or more contiguous hard-matching pairs of shots in the target episode 310a and the reference video content 310b may be determined. Here, the shot 313a of the target episode 310a and the corresponding shot 313b of the reference video content 310b both have the same video fingerprint (B) and shot length ($L_2$). The shot 314a of the target episode 310a and the shot 314b of the reference video content 310b also both have the same video fingerprint (C) and shot length ($L_3$). The shot pairs 313a,b and 314a,b may comprise the contiguous series of hard-matching shots, which accordingly may be regarded as introduction portion shots. The shots 313a,b and 314a,b are colored darker gray in FIG. 3 to identify them as hard-matching shots.

The series of introduction portion shots 313a,b and 314a,b may be dilated by determining that a contiguous pair of shots are soft-matching introduction portion shots. In this example, the shots 312a,b are contiguous with the shots 313a,b but have neither the same video fingerprint (video fingerprint A for shot 312a and video fingerprint F for shot 312b) nor the same shot length (length $L_1$ for shot 312a and length $L_6$ for shot 312b) and so are not hard-matching. However, a model (e.g., the model 226 of FIG. 2) may be used to determine that the shots 312a,b are soft-matching introduction portion shots. For example, the video fingerprint A and shot length $L_1$ (and/or other shot characteristics) of the shot 312a and the video fingerprint F and shot length $L_6$ (and/or other shot characteristics) of the shot 312b may be input to the model to determine that the shots 312a,b are soft-matching introduction portion shots. As a further example, the video fingerprint A and shot length $L_1$ of the shot 312a and the video fingerprint F and shot length $L_6$ of the shot 312b may be input to the GBR( ) function in Eq. (5) below to determine that the shots 312a,b are soft-matching introduction portion shots.

Further, the shots 315a,b are contiguous with the shots 314a,b but are not themselves hard-matching because they have different lengths ($L_4$ versus $L_7$, which are understood to have a difference greater than a shot length threshold). As with the shots 312a,b, the model may be used to determine that the shots 315a,b are soft-matching introduction portion shots. At this point, the boundaries of the introduction portion have dilated such that the introduction portion spans from the shots 312a,b to the shots 315a,b. Despite the shots 316a,b not being per se contiguous with a pair of hard-matching shots (e.g., the shots 314a,b), the shots 316a,b may be potentially identified as introduction portion shots because they are contiguous with the soft-matching shots 315a,b. For example, the shots 316a,b may be treated as contiguous with the hard-matching shots 314a,b via the soft-matching shots 315a,b. The shots 316a,b may be determined to be soft-matching introduction portion shots based on the model. The shots 312a,b, 315a,b, and 316a,b are identified in FIG. 3 as soft-matching introduction portion shots by their light gray coloration.

The shots 317a,b may potentially also be soft-matching introduction portion shots since they are contiguous with the shots 316a,b. Yet based on input of the video fingerprint H and shot length $L_8$ of the target episode shot 317a and the video fingerprint I and shot length $L_9$ of the reference video content shot 317b to the model, it may be determined that the shots 317a,b are not soft-matching introduction portion shots, which is reflected in their cross-hatched coloration in FIG. 3. As such, it may be determined that the introduction portion in the target episode 310a comprises the shots 312a to 316a (but not the shot 317a). If the introduction portion is not already known in the reference video content 310b, it may be determined that the introduction portion in the reference video content 310b comprises the shots 312b to 316b (but not the shot 317b).

Figure 4:
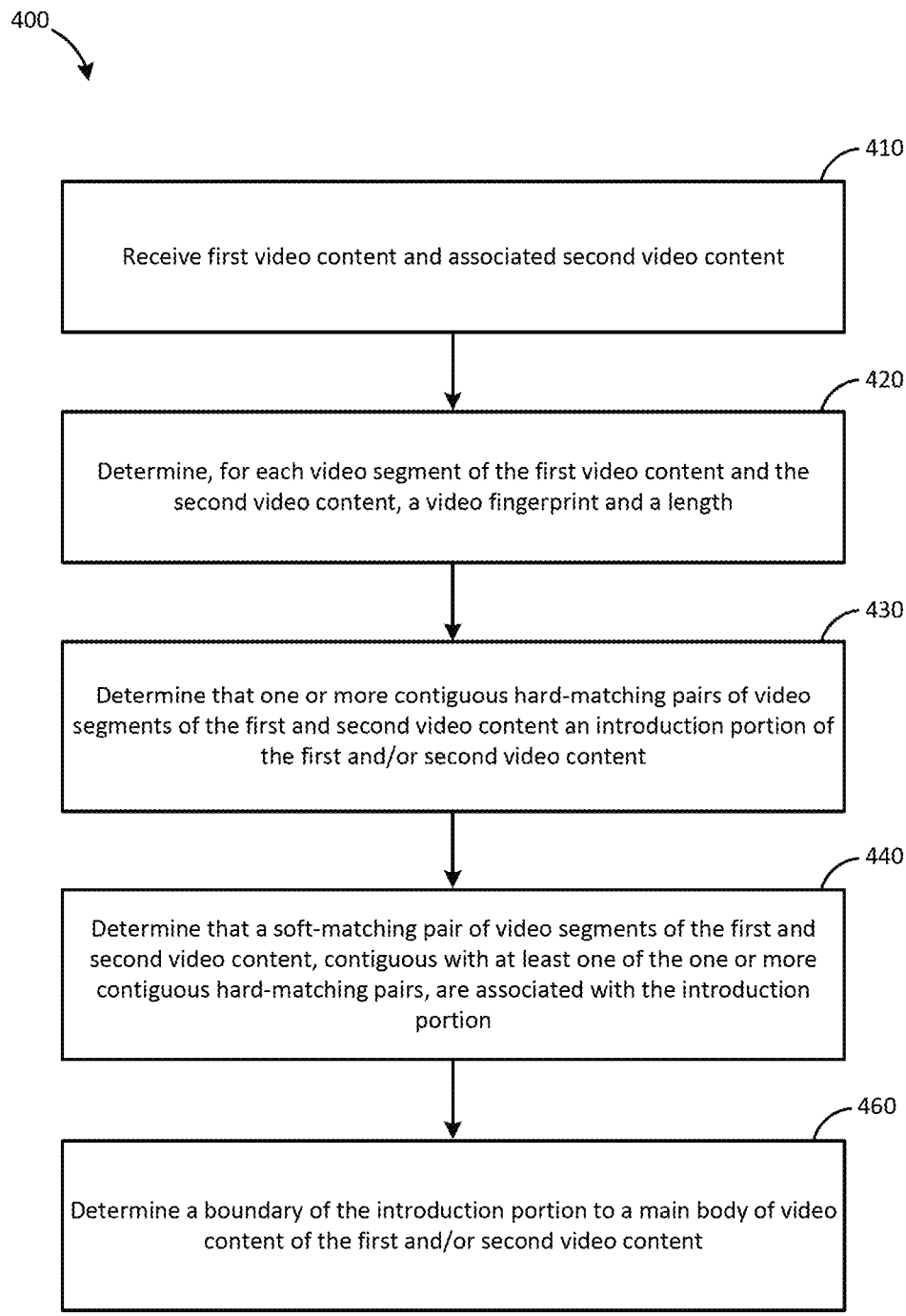
FIG. 4 is a flow diagram of an example method.

FIG. 4 illustrates a flow diagram of a method 400 to determine at least part of an introduction portion (or other visually similar portion) of at least one of first video content (e.g., a target episode) or second video content (e.g., reference video content). The at least part of the introduction portion may be determined via a model, such as the model 226 of FIG. 2 or the model 526 of FIG. 5. The model may be a machine learning model, such as a gradient boosting regressor. The method 400 may be performed by the video distribution system 102 of FIG. 1, such as the video analysis system 105 of the video distribution system 102.

At step 410, first video content and second video content may be received. The first video content may be associated with the second video content, such as via a common video program series. For example, the first video content may comprise a video program (e.g., an episode), or portion thereof, of a video program series and the second video content may comprise a reference introduction portion for the video program series. The first video content may comprise video content that has not yet been distributed for public viewing (e.g., not yet broadcast or made available for digital media streaming or on-demand delivery). The second video content may comprise reference video content that is stored for purposes of determining an introduction portion (or other visually similar portion) in the first video content. The first and second video content may each comprise video segments. A video segment may comprise a shot in the video content, which may be delineated by shot boundaries.

At step 420, a video fingerprint and a length may be determined for each video segment of the first and second video content. A video fingerprint for a video segment may be based on a single frame of the plurality of frames of the video segment. A video fingerprint may comprise an RGB or CLD descriptor for the representative frame of the video segment. A video fingerprint may comprise a 10-digit hash or other alphanumeric value. The length of each video segment may be expressed in seconds or frames. Additionally or alternatively to video fingerprint and length, one or more other characteristics may be determined for each video segment of the first and second video content. Such other characteristics of a video segment may include audio elements, an audio fingerprint, closed captioning data, subtitle data, on-screen text, or a detected visual feature.

At step 430, it may be determined that one or more contiguous hard-matching pairs of video segments of the first and second video content are associated with an introduction portion of at least one of the first video content or the second video content. For example, the one or more contiguous hard-matching pairs of video segments may comprise at least a first part of the introduction portion. For each hard-matching pair of video segments of the one or more contiguous hard-matching pairs of video segments, the respective video fingerprints of the hard-matching pair of video segments may match. Additionally or alternatively, a difference between the respective lengths of the hard-matching pair of video segments may satisfy (e.g., does not exceed) a length threshold. For example, step 430 may comprise identifying the one or more contiguous hard-matching pairs by determining, for each hard-matching pair, that the respective video fingerprints of the hard-matching pair match and the difference between the respective lengths of the hard-matching pair satisfies the length threshold. The shots 313a,b and the shots 314a,b of FIG. 3 may provide an example of the one or more contiguous hard-matching pairs of video segments.

At step 440, it may be determined that a boundary soft-matching pair of video segments of the first video content and the second video content are associated with the introduction portion of the at least one of the first video content or the second video content. The soft-matching pair of video segments may be contiguous with at least one of the one or more contiguous hard-matching pairs of video segments. The soft-matching pair of video segments may comprise at least a second part of the introduction portion. For the soft-matching pair of video segments, the respective video fingerprints of the soft-matching pair may not match. Additionally or alternatively, a difference between the respective lengths of the soft-matching pair may not satisfy (e.g., does exceed) the length threshold. For example, step 440 may comprise identifying the soft-matching pair of video segments by determining that the respective video fingerprints of the boundary soft-matching pair do not match and/or that the difference between the respective lengths of the boundary soft-matching pair does not satisfy the length threshold. The soft-matching pair of video segments may temporally correspond, at least in part, between the first video content and the second video content. The shots 312a,b or the shots 315a,b of FIG. 3 may provide examples of the boundary soft-matching pair of video segments.

Figure 5:
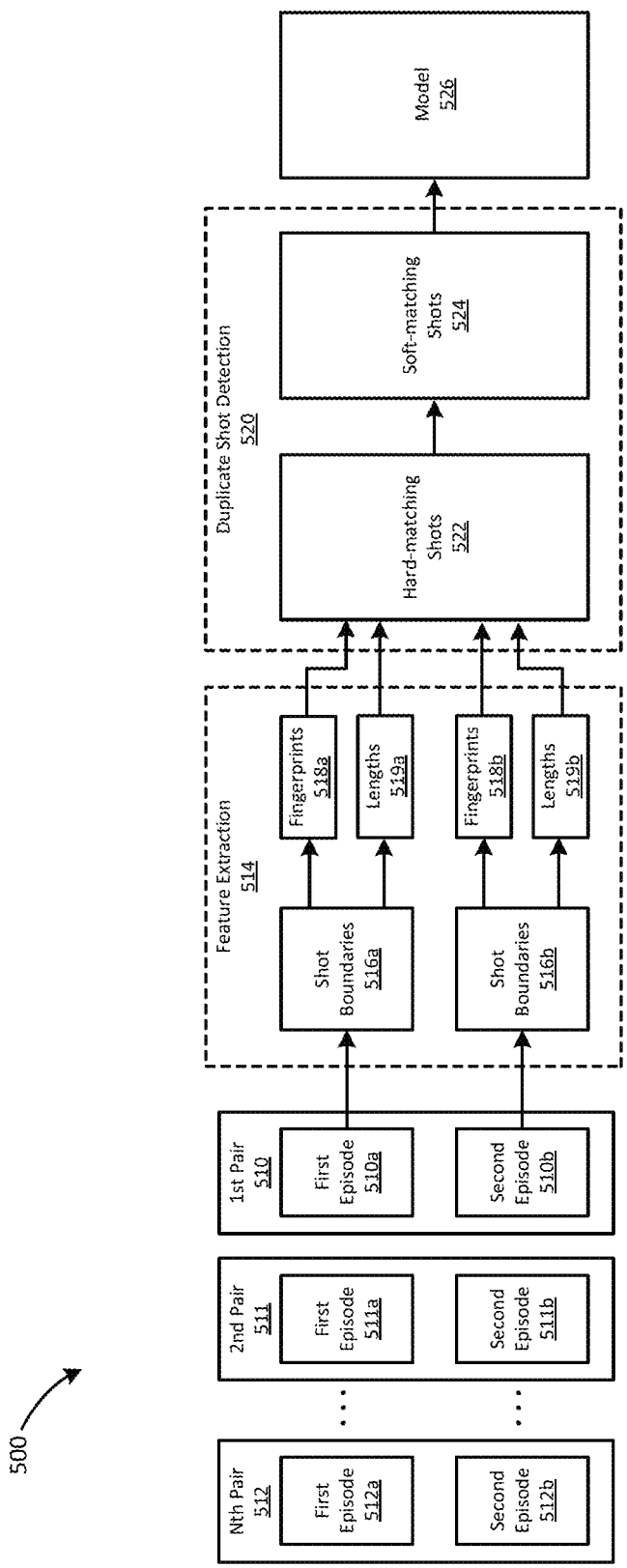
FIG. 5 is a diagram of another example data flow.

The soft-matching pair of video segments may be determined via a model (e.g., the model 226 of FIG. 2 or the model 556 of FIG. 5). For example, the respective video fingerprints of the soft-matching pair of video segments and/or the respective lengths of the soft-matching pair of video segments may be input to the model. A difference between the respective video fingerprints of the boundary soft-matching pair of video segments and/or the difference between the respective lengths of the boundary soft-matching pair of video segments may be input to the model, such as in the case of a gradient boosting regressor. The model may be specific to the video program series (e.g., television program series) associated with the first and second video content or the model may be generalized for various different video program series.

Additionally or alternatively to using a model to determine the soft-matching pair of video segments, the soft-matching pair of video segments may be determined via video analysis or other similar algorithm. The video analysis may determine one or more characteristics for each of the video segments and the resultant characteristics for the respective video segments may be compared to one another to determine that the video segments are soft-matching. A characteristic of a video segment may comprise one or more objects recognized (e.g., via various known object recognition technique(s)) in the video segment and/or a frame of the video segment. For example, the one or more objects recognized in one video segment of a pair may be compared with the one or more objects in the other video segment of the pair to determine that the pair are soft-matching.

At step 460, a boundary of the introduction portion to the main body of video content of the at least one of the first video content or the second video content may be determined. For example, the first part of the introduction portion may precede the second part of the introduction portion. In the context of a television program series, for example, the first part of the introduction portion may comprise the television program's opening visuals and theme song that remain consistent from episode to episode. The second part of the introduction portion may comprise a transition from the introduction portion (e.g., the first part of the introduction portion) to the main body of video content of the first video content and/or the second video content. The main body of video content may comprise, for example, the episodic content of a television program. The main body of video content may comprise the portion(s) of the video content other than the introduction portion. The main body of video content may comprise the video content between the introduction portion and a closing portion (e.g., the closing credits). The transition may comprise one or more transition effects, such as a fade-out, a fade-in, or a dissolve.

The second part of the introduction portion may be susceptible to variations from episode to episode. For example, there may be slight variations in a transition effect and/or the length of a transition effect. Additionally or alternatively, the second part of the introduction portion may comprise a text sequence with a guest actor or director for the particular episode, which may be shown just before the main body of content begins. The techniques described herein may enable a system to identify this transition period (e.g., the transition effects and/or additional actor/director credits) as part of the introduction portion despite the fact that it is not identical between the first video content and second video content.

In addition to determining that a video segment pair in the first and second video content comprises part of the introduction portion of the first and second video content (i.e., the pair are soft-matching), the techniques described herein may be equally applied to determine that at least one of the video segments of a video segment pair does not comprise the introduction portion (e.g., the pair are not soft-matching). For example, a system may determine that a video segment in first video content does not comprise part of the introduction portion despite the fact that a temporally corresponding video segment in second video content does comprise part of the introduction portion. The system may instead identify this video segment in the first video content as part of the main body of video content of the first video content. Indeed, an initial contiguous sequence of hard-matching video segment pairs may be iteratively dilated or expanded to include additional boundary soft-matching or hard-matching video segment pairs (e.g., the soft-matching shots 316*a*,*b* of FIG. 3) until it is determined that a boundary video segment pair is neither soft-matching nor hard-matching (e.g., the shots 317*a*,*b* of FIG. 3). In this manner, the introduction portion may be determined to its full extent, up to the point that the main body of video content begins. In application, for example, if a user elects to skip the introduction portion while viewing the first video content, the user's video display device may jump to (e.g., cause to output) this video segment to start the main body of the first video content.

The method 400 may be performed with respect to other characteristics of a video segment instead of or in addition to video fingerprint and length, such as audio elements, an audio fingerprint, closed captioning data, subtitle data, on-screen text, or a detected visual feature. In this case, a hard-matching pair of video segments may comprise a pair of video segments in which respective first characteristics of the pair of video segments match one another and respective second characteristics of the pair of video segments match one another. A soft-matching pair of video segments may comprise a pair of video segments in which the respective first characteristics of the pair of video segments do not match one another and/or the respective second characteristics of the pair of video segments do not match one another. For example, the first characteristic may comprise a video fingerprint, a video segment length, audio elements, an audio fingerprint, closed captioning data, subtitle data, on-screen text, or a detected visual feature and the second characteristic may comprise audio elements, an audio fingerprint, closed captioning data, subtitle data, on-screen text, or a detected visual feature. Hard-matching and soft-matching pairs may be defined with respect to any number of characteristics and are not limited to just two characteristics.

FIG. 5 illustrates a block diagram 500 of example processes to determine a model 526 configured to identify an introduction portion in a target video program (e.g., target episode). For example, the model 526 may be configured to determine if a shot in a target episode is soft-matching with a corresponding shot in a reference episode of the same video program series. The model 526 may comprise a supervised machine learning model, such as a gradient boosting regressor. The model 526 may be determined based on training data comprising a plurality of pairs of episodes, with each particular pair being associated with the same video program series. Here, the plurality of pairs of episodes includes a first pair 510 comprising a first episode 510*a* and a second episode 510*b*, a second pair 511 comprising a first episode 511*a* and a second episode 511*b*, and additional pairs of episodes up to an Nth pair 512 comprising a first episode 512*a* and a second episode 512*b*. The first pair 510 of episodes may be associated with a first video program series, the second pair 511 of episodes may be associated with a second video program series, and so forth. More than one pair of episodes may be associated with the same video program series. FIG. 5 is discussed in terms of video program episodes, but is equally applicable to video programs generally, as well as portions or segments of a video program.

Considering the first pair 510 of episodes, the first episode 510a and the second episode 510b may be subjected to feature extraction 514 processes. Under feature extraction 514, the shot boundaries 516a of the first episode 510a and the shot boundaries 516b of the second episode 510b may be determined. Accordingly, the shots of the first and second episodes 510a,b may be determined. A shot boundary 516a,b may refer to a substantial change in video content from one moment of an episode to the next.

Based on the shot boundaries 516a of the first episode 510a, a video fingerprint 518a and a length 519a may be determined for a plurality of shots (e.g., each shot) of the first episode 510a. Likewise, based on the shot boundaries 516b of the second episode 510b, a video fingerprint 518b and a length 519b may be determined for a plurality of shots (e.g., each shot) of the second episode 510b. A video fingerprint 518a,b for a shot may comprise a video fingerprint for a single frame of the shot, such as the first frame of the shot. The feature extraction 514, the shot boundaries 516a,b, the video fingerprints 518a,b, and the lengths 519a,b may be the same as or similar to the feature extraction 214, the shot boundaries 216a,b, the video fingerprints 218a,b, and the lengths 219a,b of FIG. 2, respectively.

Duplicate shot detection 520 processes may be performed based on the video fingerprints 518a,b and lengths 519a,b of the first and second episodes 510a,b, respectively. In duplicate shot detection 520, a plurality of hard-matching shots 522 may be determined. The hard-matching shots 522 may comprise a plurality of shot pairs, with each pair comprising a first episode 510a shot and a hard-matching second episode 510b shot. A first episode 510a shot and a second episode 510b shot may be hard-matching when the video fingerprint 518a of the first episode 510a shot matches the video fingerprint 518b of the second episode 510b shot and the difference between the length 519a of the first episode 510a shot and the length 519b of the second episode 510b shot is within a pre-defined threshold (e.g., 0.5 seconds). The hard-matching shots 522 may be further subjected to processes to determine that the shots of a hard-matching pair temporally align with one another, at least to a sufficient extent. If any initially-determined hard-matching shots do not sufficiently temporally align, they may be excluded from the hard-matching shots 522. For example, this may be accomplished via a temporal recurrence hashing method in which a 2-stage hashing algorithm is applied to all shot recurrences on the basis of their temporal alignment. The temporal recurrence hashing method may be performed according to Eqs. (1) and (2) below.

$$h1(T_i, R_j) = \text{floor}\left(\frac{i}{r1}\right)$$ Eq. (1)

$$h2(T_i, R_j) = \text{floor}\left(\frac{j-i}{r2}\right)$$ Eq. (2)

In Eq. (1), h1( ) may refer to a temporal position of the first occurrence of a shot and r1 may refer to an independent variable which may be set to no less than the restricted length of the duplicate introduction portion to be detected (e.g., 60 seconds). In Eq. (2), h2( ) may refer to a temporal interval between the first and subsequent occurrences of the shot and r2 may refer to an independent variable which may be set to no less than the restricted gap between reoccurrences of the shot (e.g., 1 second). In either Eqs. (1) and/or (2), $T_i$ may refer to the ith shot of the first episode 510a (e.g., a target episode) and $R_j$ may refer to the jth shot of the second episode 510b (e.g., a reference episode). A hash table and histogram may be populated accordingly and a local maxima in the hash histogram may be determined. The hard-matching shots 522 may be determined further based on the local maxima in the hash histogram. Morphological filtering may be used to remove any holes or noise that occur in the shots sequentially between hard-matching shots.

Since the various episodes of a video program series may share little, if any, common video content besides the introduction portions, the hard-matching shots 522 may be regarded as introduction portion shots of the first and second episodes 510a,b. Due to minor variations between some shots of the introduction portion in the first episode 510a and the corresponding shots of the introduction portion in the second episode 510b, these shots may not be hard-matches of each other. Yet if these shots are between (with respect to the sequence of shots in the introduction portion) two or more hard-matching shots 522, they may be regarded or classified as soft-matching shots 524 of the introduction portion, at least for purposes of determining the model 526. In a similar manner as the hard-matching shots 522, the soft-matching shots 524 may comprise one or more pairs of a first episode 510a shot and a corresponding (temporally, at least in part) second episode 510b shot. In a soft-matching pair, the video fingerprints do not match and/or the difference between the shot lengths exceeds the shot length threshold. This is opposed to a hard-matching pair in which both the video fingerprints match and the difference in shot lengths is less than or equal to the shot length threshold.

The soft-matching shots 524 may be used to determine (e.g., train) the model 526. For example, the soft-matching shots 524 may form training data for training the model. Because the soft-matching shots 524 may be regarded or classified as (soft-matching) shots of the introduction portion in the first and second episodes 510a,b, it is not required that the soft-matching shots 524 be labelled as such manually, but are rather labeled—for the purpose of machine learning-automatically according to the techniques described herein. For example, the video fingerprints 518a,b and the lengths 519a,b for each pair of soft-matching shots 524 may form a training data input (e.g., a feature vector) and the automatic classification of each pair of soft-matching shots 524 as introduction portion shots may form a training data output. In the case of a gradient boosting regressor as the model 526, for each pair of soft-matching shots 524, a difference between the video fingerprint 518a of the first episode 510a shot and the video fingerprint 518b of the second episode 510b shot and a difference between the length 519a of the first episode 510a shot and the length 519b of the second episode 510b shot may be determined. The video fingerprint and length differences for each pair of soft-matching shots 524 may be organized as objects in a regressor matrix. Such a regressor matrix may be used to determine the gradient boosting regressor (e.g., the model 526).

The model 526 may be iteratively updated based on additional pairs of episodes, with each additional pair comprising a first and second episode of a video program series. For example, the model 526 may be further updated based on the second pair 511 of episodes comprising the first episode 511a and the second episode 511b. The first episode 511a and the second episode 511b may be from the same video program series. The video program series of the second pair 511 of episodes may be the same as or different than the video program series of the first pair 510 of episodes. The feature extraction 514 and duplicate shot detection 520 processes may be repeated with respect to the first episode 511a and the second episode 511b to update the model 526. Additional iterations may be performed on additional episode pairs, including the Nth pair 512 of episodes comprising the first and second episodes 512a,b.

Figure 6:
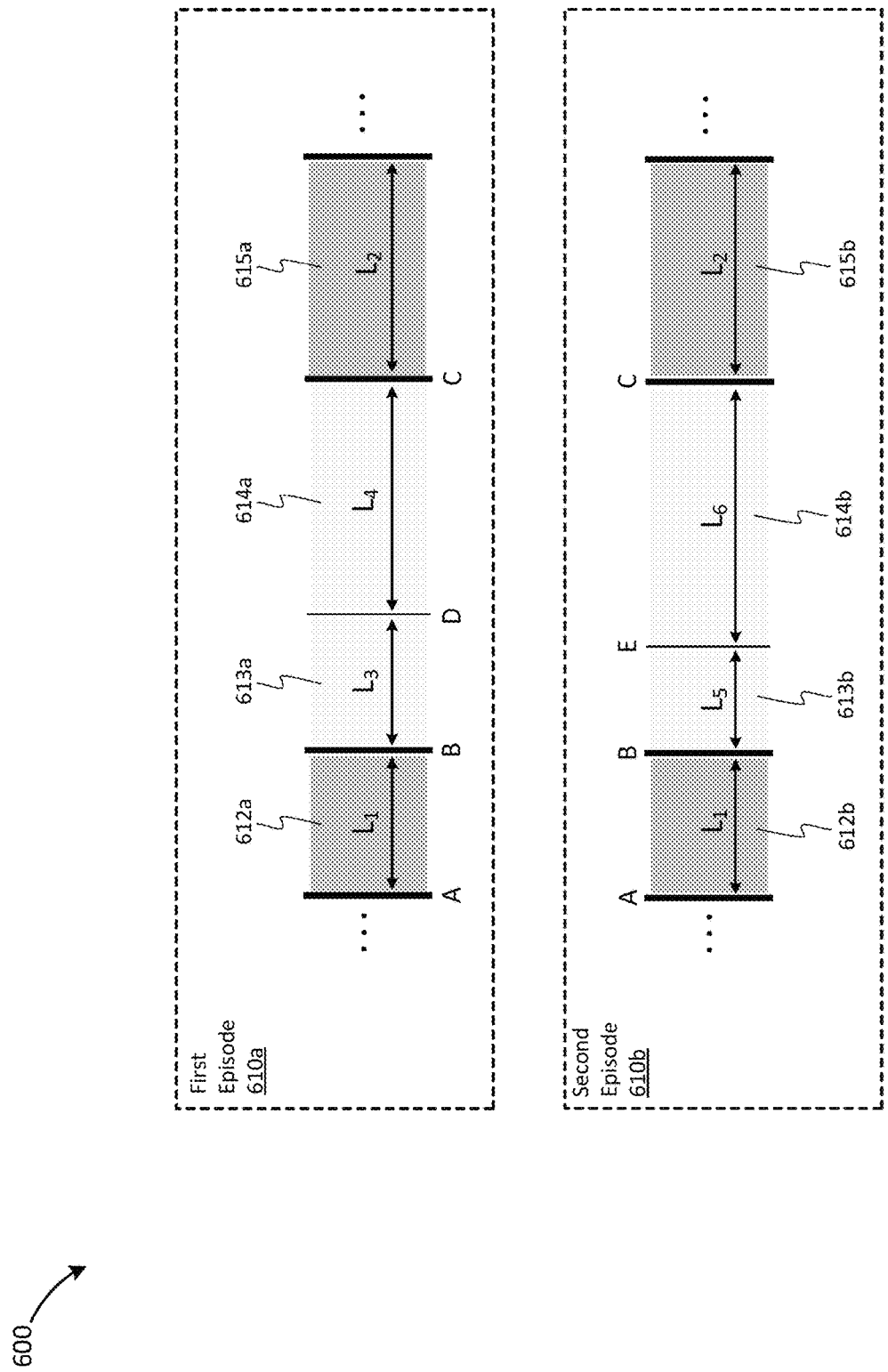
FIG. 6 is a diagram of another example video segment sequence.

FIG. 6 illustrates a diagram 600 of an example episode pair comprising a first episode 610a and a corresponding, at least in part, second episode 610b. The first and second episodes 610a,b may be from the same video program series. This episode pair shown in FIG. 6 may be an example of the first pair 610 of episodes in FIG. 5. The diagram 600 shall be used to illustrate examples of hard-matching shots and soft-matching shots, as well as how they may be used in determining a model (e.g., the model 556 of FIG. 5), such as a gradient boosting regressor. It is noted that the diagram 600 is not necessarily to scale.

The first episode 610a comprises a plurality of shots 612a-615a and the second episode 610b likewise comprises a plurality of shots 612b-615b. The various shots of the first and second episodes 610a,b shown in FIG. 6 are contemplated as only a subset of the total shots of the first and second episodes 610a,b. The shots are delineated by vertical bars, each with an alphabetic label (A, B, C, D, E, or F). The alphabetic labels indicate the video fingerprint for the shot just subsequent to the vertical bar. For example, the shot 612a of the first episode 610a and the shot 612b of the second episode 610b both have a video fingerprint A. Matching video fingerprints are indicated by a bold vertical line and non-matching video fingerprints are indicated by a thin vertical line. The double-arrowed horizontal lines indicate the lengths of the respective shots. Where a pair of shots are labeled as having the same length, this may indicate that the difference between the shots' respective lengths is under a pre-defined shot length threshold. Similarly, reference to various lengths as "matching" or the like may indicate that the difference between the lengths is under the shot length threshold (e.g., satisfies the shot length threshold) and reference to various lengths as "non-matching" or the like may indicate that the difference between the lengths exceeds the shot length threshold (e.g., does not satisfy the shot length threshold).

In the first and second episodes 610a,b, the shot 612a of the first episode 610a and the shot 612b of the second episode 610b both have the same video fingerprint (A) as well as the same length ($L_1$). The shot 615a and the shot 615b also have the same video fingerprint (D) and length ($L_2$) as each other. Accordingly, the shots 612a,b comprise a hard-matching pair of shots and the shots 615a,b comprise another hard-matching pair of shots. The shots 612a,b and 615a,b are colored darker gray in FIG. 6 to identify them as hard-matched shots. The shot 613a of the first episode 610a and the shot 613b of the second episode 610b have the same video fingerprint (B) but do not have the same length ($L_3$ versus $L_5$). The shot 614a and the shot 614b have neither same video fingerprint (D versus E) nor the same shot length ($L_4$ versus $L_6$).

While the shots 613a,b and the shots 614a,b are not hard-matches, they are sequentially between the hard-matching shots 612a,b and the hard-matching shots 615a,b. Following the methodology described in relation to the duplicate shot detection 520 of FIG. 5, the shots 613a,b and the shots 614a,b may be treated or classified as soft-matching shot pairs (e.g., the soft-matching shots 524 of FIG. 5) in the introduction portions of the first and second episodes 610a,b. The shots 613a,b and 614a,b are colored lighter gray in FIG. 6 to indicate their classification as soft-matching shots.

The soft-matching shots 613a,b and 614a,b may be used to determine the model. For example, the shot 613a (e.g., the video fingerprint B and shot length $L_3$) and the shot 613b (e.g., the video fingerprint E and shot length $L_5$) may be used as training data input features for determining the model via machine learning. Similarly, the shot 614a (e.g., the video fingerprint D and shot length $L_4$) and the shot 614b (e.g., the video fingerprint E and shot length $L_6$) may also be used as training data input features in determining the model via machine learning. The classification of the shots 613a,b and the shots 613a,b as introduction portion shots may be used as training data outputs for determining the model via machine learning.

In the case of the model being a gradient boosting regressor, regressor matrices may be formed to determine, at least in part, the gradient boosting regressor. An example pair of regressor matrices based on the first and second episodes 610a,b is shown below in Eq. (3).

$$\begin{bmatrix} 0 & L_5 - L_3 \\ \mathit{diff}(E, D) & L_6 - L_4 \end{bmatrix} \begin{bmatrix} 1 \\ 1 \end{bmatrix} \qquad \text{Eq. (3)}$$

In Eq. (3), the first row (i.e., object) of the left matrix represents the soft-matching shots 613a,b. As such, the first column of the first row ("0") indicates that the video fingerprints (B) of the shots 613a,b match. That is, there is no difference between those video fingerprints. The second column of the first row ("$L_5-L_3$") indicates the difference between the length of the shot 613b and the length of the shot 613a. The first row of the right matrix ("1") indicates that the shots 613a,b are classified as soft-matches for determining the regressor.

The second row (i.e., object) of the left matrix represents the soft-matching shots 614a,b. The first column of the second row ("diff (E, D)") indicates the difference between the video fingerprint (E) of the shot 614b and the video fingerprint (D) of the shot 614a. The second column of the second row ("$L_6-L_4$") indicates the difference between the length of the shot 614b and the length of the shot 614a. The second row of the right matrix ("1") indicates that the shots 614a,b are classified as soft-matches for determining the regressor. Recalling that a video fingerprint may comprise a 10-digit hash, the difference between the video fingerprint E and the video fingerprint D may be determined according to Eq. (4) below. The differences between other video fingerprints may be determined in an analogous manner.

$$\mathit{diff}(E, D) = \sum_{i=1}^{10} (1 \text{ if } E_i != D_i \text{ else } 0) \qquad \text{Eq. (4)}$$

The regressor matrices may comprise additional rows (i.e., objects) for additional shots pairs of the first and second episodes 610a,b that are between hard-matched shot pairs in the first and second episodes 610a,b and thus may be classified as soft-matching shot pairs in determining the gradient boosting regressor or other type of model. The additional soft-matching shot pairs need not necessarily be between the particular hard-matching shot pairs 612a,b and 615a,b but may instead be between other hard-matching shot pairs in the first and second episodes 610a,b. The additional soft-matching pairs may also be between one of the hard-matching shot pairs 612a,b or 615a,b and another hard-matching shot pair.

The trained gradient boosting regressor may be applied to shot pairs in other episodes to determine if those shot pairs are soft-matching. For example, one episode may be an unseen target episode and the second episode may be a reference episode (or a portion of a reference episode, including only a reference introduction portion). The gradient boosting regressor (GBR) may be applied according to the function in Eq. (5) below.

$$GbR(diff(X, Y), diff(L_X, L_Y)) \qquad \text{Eq. (5)}$$

In Eq. (5), the subject shot of the target episode may have a video fingerprint Y and a shot length LY and the corresponding shot of the reference episode may have a video fingerprint X and a shot length Lx. If the result of the GBR( ) function is greater than a pre-defined threshold (e.g., satisfies the threshold), then the subject shot of the target episode may be considered a soft-match with the corresponding shot of the reference episode. For example, the threshold may be 0.5.

The gradient boosting regressor, and a model for soft-matching generally, may be determined based on other shot characteristics (e.g., features) in addition to or instead of video fingerprints and/or shot lengths. The additional or alternative shot characteristics may be included in the input feature vector for determining the gradient boosting regressor or other type of model. For example, each object represented in a feature vector regressor matrix may include an additional column for an additional shot characteristic. An additional or alternative shot characteristic may include, for example, textual aspects associated with a shot, such as closed captioning data, subtitle data, or on-screen text (e.g., credits). An additional or alternative shot characteristic may include a detected visual feature, such as a detected face or logo. An additional or alternative shot characteristic may include audio elements associated with a shot, such as an audio fingerprint of the shot. Features of an audio fingerprint for a shot may relate to the energy of the audio in the shot, periods of silence in the shot, or music tonality, for example. Any additional or alternative shot characteristics may be determined during the feature extraction 514 of FIG. 5.

Figure 7:
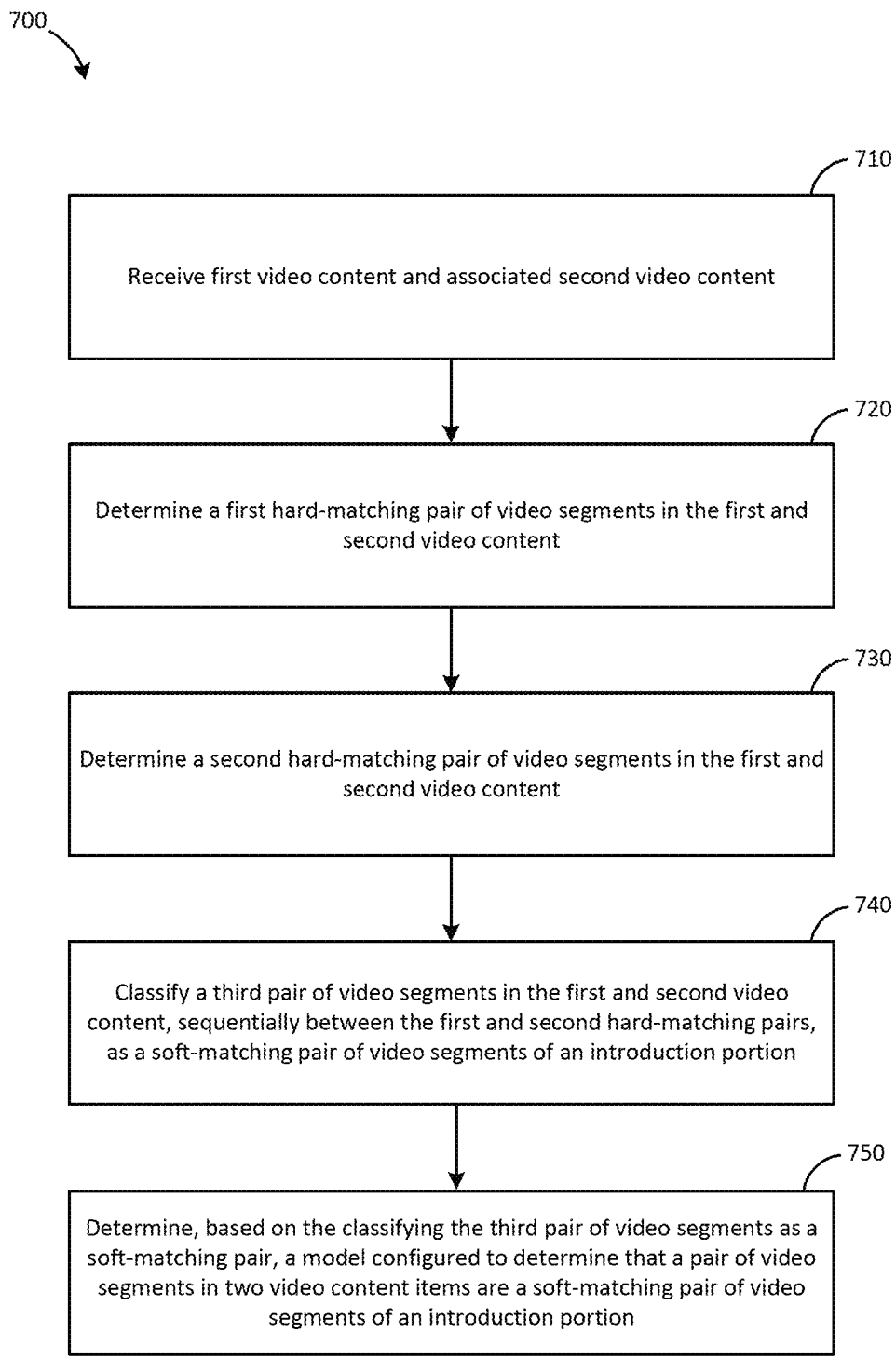
FIG. 7 is a flow diagram of an example method.

FIG. 7 illustrates a flow diagram of a method 700 to determine or classify a pair of video segments in first and second video content as a soft-matching pair of video segments of an introduction portion (or other common portion, e.g., an advertisement or closing portion) of at least one of the first and second video content. The method 700 may additionally or alternatively train a model using the above classification of the pair of video segments as a soft-matching pair of video segments. The model may be configured to determine a portion of target video content that soft-matches (e.g., visually corresponds to or is visually similar to) a portion of reference video content, such as an introduction portion of the target and/or reference video content. The model may be a machine-learning model, such as a gradient boosting regressor. The method 700 may be performed by the video distribution system 102 of FIG. 1, such as the video analysis system 105 of the video distribution system 102.

At step 710, first video content and second video content may be received. The first video content may be associated with the second video content. For example, the first and second video content may each comprise a video program (e.g., an episode), or portion thereof, of the same video program series. The second video content may comprise a known reference introduction portion associated with the video program series. Any introduction portion of the first video content may be as-yet unknown or undetermined, as may be any introduction portion of the second video content. The first and/or second video content may be video content that has not yet been distributed to public viewers (e.g., not yet broadcast or made available for digital media streaming or on-demand delivery). The first episode 610a and the second episode 610b in FIG. 6 provide examples of the first and second video content, respectively.

The first and second video content may comprise video segments. A video segment may comprise a shot in the video content, which may be delineated by shot boundaries. One or more video segments (e.g., each video segment) of the first and second video content may be associated with a video fingerprint. A video fingerprint for a video segment may be based on a single frame of the plurality of frames of the video segment. One or more video segments (e.g., each video segment) of the first and second video content may have a length, which may be expressed in seconds or frames. Each video segment of the first and second video content may be associated with one or more additional or alternative characteristics of the video segment, such as audio elements, an audio fingerprint, closed captioning data, subtitle data, on-screen text, or a detected visual feature. The method 700 may comprise determining the video fingerprints, lengths, and/or other characteristics of each video segment of the first and second video content.

At step 720, a first hard-matching pair of video segments in the first and second video content may be determined. In the first hard-matching pair of video segments, the respective video fingerprints of the first hard-matching pair may match. Additionally or alternatively, the respective lengths of the first hard-matching pair may match (e.g., a difference between the respective lengths satisfies a length threshold). For example, the respective video fingerprints of the first hard-matching pair of video segments may comprise the same hash value (e.g., 10-digit hash). The first hard-matching pair of video segments may additionally or alternatively match according to other video segment characteristics, such as audio elements, an audio fingerprint, closed captioning data, subtitle data, on-screen text, or a detected visual feature. The first hard-matching pair of video segments may temporally correspond, at least in part, with each other. The first hard-matching pair of video segments may comprise introduction video segments (e.g., video segments of the introduction portion) of at least one of the first or second video content. The shots 612a,b of FIG. 6 provide an example of the first hard-matching pair of video segments.

At step 730, a second hard-matching pair of video segments in the first and second video content may be determined. In the second hard-matching pair of video segments, the respective video fingerprints of the second hard-matching pair may match. Additionally or alternatively, the respective lengths of the second hard-matching pair may also match (e.g., a difference between the respective lengths satisfies the length threshold). The second hard-matching video segments may additionally or alternatively match according to other video segment characteristics, such as audio elements, an audio fingerprint, closed captioning data, subtitle data, on-screen text, or a detected visual feature. The second hard-matching pair of video segments may temporally correspond, at least in part, with each other. The second hard-matching pair of video segments may comprise introduction video segments (e.g., video segments of the introduction portion) of at least one of the first or second video content. The shots 615a,b of FIG. 6 provide an example of the second hard-matching pair of video segments.

At step 740, a third pair of video segments in the first and second video content may be classified as a soft-matching pair of video segments of an introduction portion of at least one of the first video content or the second video content. The third pair of video segments may be sequentially between the first and second hard-matching pairs of video segments. The respective video fingerprints of the third pair of video segments may not match. Classifying the third pair of video segments as a soft-matching pair of video segments may be additionally or alternatively based on the respective lengths of the third pair of video segments. For example, classifying the third pair of video segments as soft-matching may comprise determining that respective video fingerprints of the third pair of video segments do not match and/or determining that the respective lengths of the third pair of video segments do not match (e.g., a difference in their respective lengths does not satisfy the length threshold). The third pair of video segments may temporally correspond, at least in part, with each other. The shots 613a,b in FIG. 6 provide an example of the soft-matching pair of video segments.

At step 750, a model (e.g., the model 526 of FIG. 5) may be determined based on the classifying the third pair of video segments as a soft-matching pair of video segments of an introduction portion of at least one of the first video content or the second video content. The model may be determined further based on other "in-between" pairs of video segments that are determined or classified as a soft-matching pair of video segments. The other pairs of video segments may be from the first and second video content (e.g., the shots 614a,b of FIG. 6) or from other video content.

The model may be configured to determine that a pair of video segments in two video content items are a soft-matching pair of video segments of an introduction portion of at least one of the two video content items. The two video content items may comprise a target video content item (e.g., a target episode) and a reference video content item (e.g., an associated episode, or portion thereof, with a known introduction portion). The model may be configured to determine at least part of the introduction portion in the target video content. Alternatively, an introduction portion may be unknown in both of the two video content items. The model may be configured to determine at least part of the introduction portion in either or both of these two video content items.

The model may be a machine-learning model, such as a gradient boosting regressor or other supervised machine-learning model. The model, such as a gradient boosting regressor, may be determined based on at least one of a difference between the respective video fingerprints of the third pair of video segments or a difference between the respective lengths of the third pair of video segments. The difference between the video fingerprints may be determined according to Eq. (4). The respective differences between video fingerprints and lengths may be organized as a regressor matrix, such as that shown in Eq. (3), to determine a gradient boosting regressor. In determining the model via machine learning, the respective video fingerprints and/or respective lengths of the third pair of video segments may comprise a training data input (e.g., a feature vector) and the classification of the third pair of video segments as a soft-matching pair of video segments of an introduction portion of at least one of the first video content or the second video content may comprise a training data output.

It will be noted that the method 700 may be performed with respect to additional and/or alternative video segment characteristics, such as audio elements, an audio fingerprint, closed captioning data, subtitle data, on-screen text, or a detected visual feature. For example, a first characteristic may comprise a video fingerprint, a video segment length, audio elements, an audio fingerprint, closed captioning data, subtitle data, on-screen text, or a detected visual feature and a second characteristic may comprise audio elements, an audio fingerprint, closed captioning data, subtitle data, on-screen text, or a detected visual feature. The method 700 may also be performed with respect to a single video segment characteristic or more than two video segment characteristics.

The techniques described herein may be similarly applied to other types of common video content in addition to introduction portions, including the techniques relating to use of the model 226 of FIG. 2 or the like to determine an introduction portion and determining the model 556 of FIG. 5. The techniques described herein may be applied generally to any type of video content that may be common to two or more video content items. The two or more video content items may be associated with one another, un-associated with one another, or some combination thereof.

The techniques described herein may be applied to advertisements that appear in two or more video content items. For example, a particular advertisement may be shown during an episode of a video program series and shown again during another episode of the same video program series. Additionally or alternatively, a particular advertisement may be shown during an episode of a first video program series and again during an episode of a second video program series.

Besides enabling a user to skip an introduction portion (or other type of common video content) based on an identification of said portion, additional or alternative functions may be provided that are similarly based on identifying common video content between two or more video content items. For example, a user may interact with identified common video content item in various ways. A user may provide an input, such as via a remote control, to cause an email or text message relating to a product or service of an advertisement to be sent to the user, for example. The email or text message may include a coupon or discount for the product or service or a link to a webpage for the product or service. The user input may initiate a phone call from the user to a party associated with the advertised product or service. Conversely, the user input may trigger a phone call to the user from a party associated with the advertised product or service. The user input may indicate the user's interest in the advertised product or service. The user input may cause a webpage associated with the advertised product or service to be opened.

The techniques described herein to determine common video content (e.g., an advertisement or introduction portion) may be used to track the instances that particular common video content is shown to users. Based on this data, it may be determined that a user has been shown the common video content on multiple occasions and thus may be inattentive when such common video content is subsequently shown (e.g., exceeds a threshold number of viewings). Accordingly, alternative video content may be shown in place of or in addition to the repetitive common video content. The alternative video content may comprise news, weather, or a social media feed. For example, a picture-in-picture window may display the alternative video content.

The techniques described herein may be used to gather viewing metrics associated with introduction portions or other types of common video content. The metrics may describe user behaviors associated with skipping common video content, such as skipping introduction portions. The metrics may indicate how many users skip a particular instance of common video content, including on an episode-by-episode basis or across multiple episodes of a video program series. The metrics may indicate particular users' skipping behaviors, such as what percentage of times a particular user skips common video content. For example, the metrics may indicate how often a particular user skips common video content generally or how often the user skips common video content associated with a particular video program series.

Figure 8:
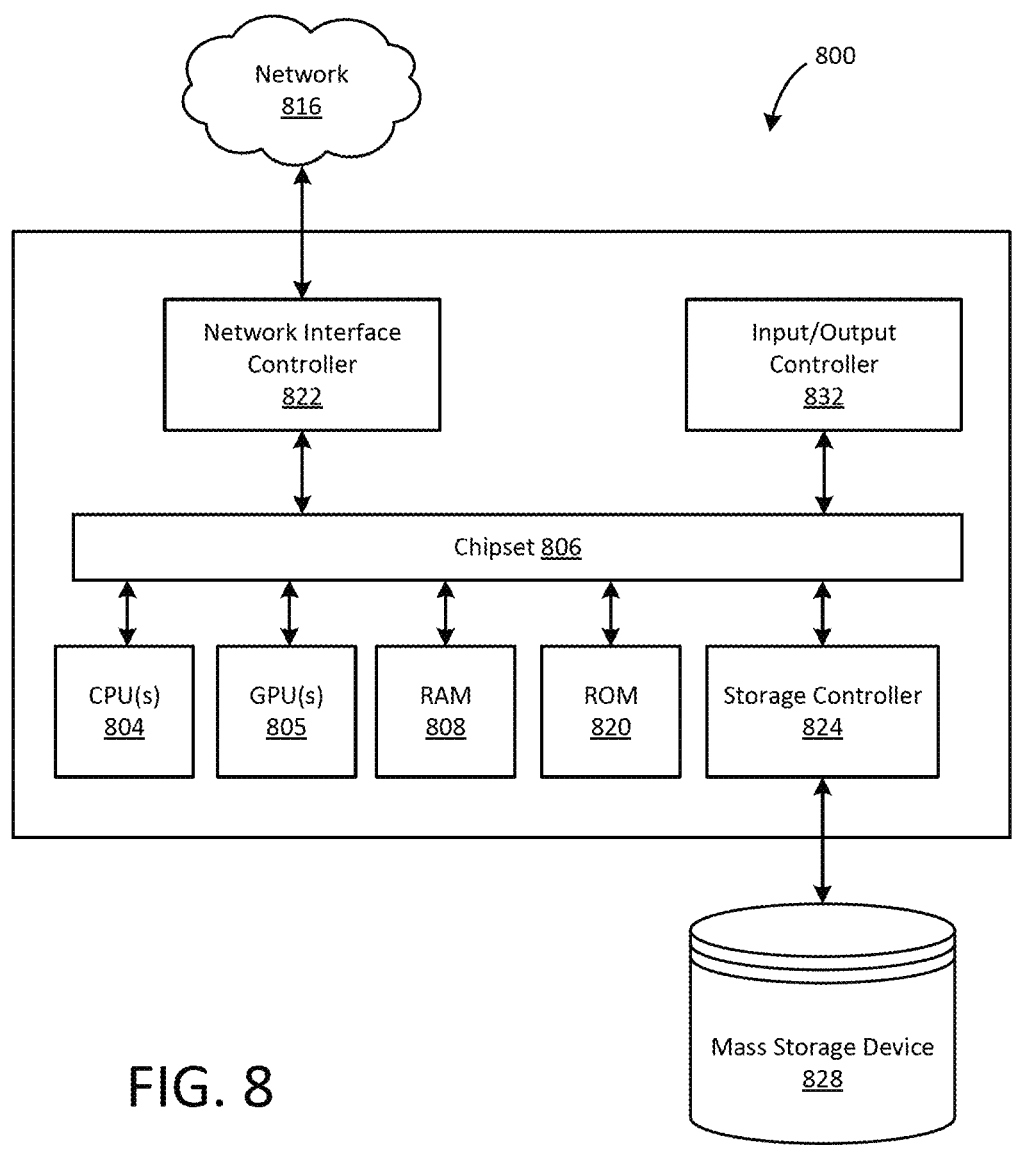
FIG. 8 is a block diagram of an example computing device.

FIG. 8 depicts an example computing device in which the systems, methods, and devices disclosed herein, or all or some aspects thereof, may be embodied. For example, components such as the video distribution system 102, the video source 103, the video analysis system 105, and the video devices 104 of FIG. 1 may be implemented generally in a computing device, such as the computing device 800 of FIG. 8. The computing device of FIG. 8 may be all or part of a server, workstation, desktop computer, laptop, tablet, network appliance, PDA, e-reader, digital cellular phone, set top box, or the like, and may be utilized to implement any of the aspects of the systems, methods, and devices described herein.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described above, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology.

Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device 800 may have access to computer-readable storage media storing computer-executable instructions, which, when executed by the computing device 800, may perform the methods described herein.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the systems, methods, and devices are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described systems, methods, and devices. When combinations, subsets, interactions, groups, etc., of these components are described, it is understood that while specific references to each of the various individual and collective combinations and permutations of these may not be explicitly described, each is specifically contemplated and described herein, for all systems, methods, and devices. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the systems, methods, and devices may take the form of an entirely hardware embodiment, an entirely software embodiment, or an embodiment combining software and hardware aspects. Furthermore, the systems, methods, and devices may take the form of a computer program product on a computer-readable storage medium having computer-readable program instructions (e.g., computer software) embodied in the storage medium. More particularly, the present systems, methods, and devices may take the form of web-implemented computer software. Any suitable computer-readable storage medium may be utilized including hard disks, CD-ROMs, optical storage devices, or magnetic storage devices.

Embodiments of the systems, methods, and devices are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the systems, methods, and devices have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
   determining that one or more hard-matching pairs of video segments of a first video content and a second video content are associated with an introduction portion of at least one of the first video content or the second video content;
   determining, based on a machine learning model, one or more soft-matching pairs of video segments of the first video content and the second video content that are associated with the introduction portion of the at least one of the first video content or the second video content;
   determining, based on the machine learning model, that a pair of video segments of the first video content and the second video content following a contiguous sequence of the one or more hard-matching and the one or more soft-matching pairs of video segments are neither a hard-matching pair of video segments nor a soft-matching pair of video segments; and
   determining, based on the determination that the pair of video segments of the first video content and the second video content is neither a hard-matching pair of video segments nor a soft-matching pair of video segments, that the pair of video segments of the first video content and the second video content are associated with a main body of video content of the at least one of the first video content or the second video content.

2. The method of claim 1, wherein, for each hard-matching pair of video segments of the one or more hard-matching pairs of video segments, video fingerprints associated with the hard-matching pair of video segments match.

3. The method of claim 1, wherein, for each soft-matching pair of video segments of the one or more soft-matching pairs of video segments, video fingerprints associated with the soft-matching pair of video segments do not match.

4. The method of claim 1, wherein the one or more soft-matching pair of video segments comprises a transition from a first part of the introduction portion of the at least one of the first video content or the second video content to the main body of video content of the at least one of the first video content or the second video content.

5. The method of claim 1, wherein the first video content comprises target video content in which the introduction portion is not known, and the second video content comprises reference video content in which the introduction portion is known.

6. The method of claim 1, wherein for each hard-matching pair of video segments of the one or more hard-matching pairs of video segments, a difference between lengths of the hard-matching pair of video segments satisfies a length threshold.

7. The method of claim 1, wherein for each soft-matching pair of video segments of the one or more soft-matching pairs of video segments, a difference between lengths of the soft-matching pair of video segments does not satisfy a length threshold.

8. The method of claim 1, further comprising causing, based on the determining that the pair of video segments of the first video content and the second video content are associated with a main body of video content of the at least one of the first video content or the second video content, output of the at least the first video content or the second video content to skip to the main body of video content.

9. A method comprising:
  determining, based on a machine learning model, that sequential pairs of video segments of a first video content and a second video content that follow contiguous hard-matching pairs of video segments of the first video content and second video content are either hard-matching pairs or soft-matching pairs until a next sequential pair of video segments of the first video content and the second video content is determined to be neither a hard-matching pair nor a soft-matching pair;
  determining, based on the determination that the next sequential pair is neither a hard-matching pair nor a soft-matching pair, that the next sequential pair of video segments of the first video content and the second video content are associated with a main body of the at least one of the first video content or the second video content.

10. The method of claim 9, wherein, for each hard-matching pair of video segments of the sequential pairs of video segments, video fingerprints associated with the hard-matching pair of video segments match.

11. The method of claim 9, wherein, for each soft-matching pair of video segments of the sequential pairs of video segments, video fingerprints associated with the soft-matching pair of video segments do not match.

12. The method of claim 9, wherein the first video content comprises target video content in which the introduction portion is not known, and the second video content comprises reference video content in which the introduction portion is known.

13. The method of claim 9, wherein for each hard-matching pair of video segments the sequential pairs of video segments, a difference between lengths of the hard-matching pair of video segments satisfies a length threshold.

14. The method of claim 9, wherein for each soft-matching pair of video segments the sequential pairs of video segments, a difference between lengths of the soft-matching pair of video segments does not satisfy a length threshold.

15. The method of claim 9, further comprising causing, based on the determining that the next sequential pair of video segments of the first video content and the second video content are associated with a main body of video content of the at least one of the first video content or the second video content, output of the at least the first video content or the second video content to skip to the main body of video content.

16. A non-transitory computer-readable medium storing instructions that, when executed, cause:
  determining that one or more hard-matching pairs of video segments of a first video content and a second video content are associated with an introduction portion of at least one of the first video content or the second video content;
  determining, based on a machine learning model, one or more soft-matching pairs of video segments of the first video content and the second video content that are associated with the introduction portion of the at least one of the first video content or the second video content;
  determining, based on the machine learning model, that a pair of video segments of the first video content and the second video content following a contiguous sequence of the one or more hard-matching and the one or more soft-matching pairs of video segments are neither a hard-matching pair of video segments nor a soft-matching pair of video segments; and
  determining, based on the determination that the pair of video segments of the first video content and the second video content is neither a hard-matching pair of video segments nor a soft-matching pair of video segments, that the pair of video segments of the first video content and the second video content are associated with a main body of video content of the at least one of the first video content or the second video content.

17. The non-transitory computer-readable medium of claim 16, wherein, for each hard-matching pair of video segments of the one or more hard-matching pairs of video segments, video fingerprints associated with the hard-matching pair of video segments match.

18. The non-transitory computer-readable medium of claim 16, wherein, for each soft-matching pair of video segments of the one or more soft-matching pairs of video segments, video fingerprints associated with the soft-matching pair of video segments do not match.

19. The non-transitory computer-readable medium of claim 16, wherein the one or more soft-matching pair of video segments comprises a transition from a first part of the introduction portion of the at least one of the first video content or the second video content to the main body of video content of the at least one of the first video content or the second video content.

20. The non-transitory computer-readable medium of claim 16, wherein the first video content comprises target video content in which the introduction portion is not known, and the second video content comprises reference video content in which the introduction portion is known.

21. The non-transitory computer-readable medium of claim 16, wherein for each hard-matching pair of video segments of the one or more hard-matching pairs of video segments, a difference between lengths of the hard-matching pair of video segments satisfies a length threshold.

22. The non-transitory computer-readable medium of claim 16, wherein for each soft-matching pair of video segments of the one or more soft-matching pairs of video segments, a difference between lengths of the soft-matching pair of video segments does not satisfy a length threshold.

23. A non-transitory computer-readable medium storing instructions that, when executed, cause:
  determining, based on a machine learning model, that sequential pairs of video segments of a first video content and a second video content that follow contiguous hard-matching pairs of video segments of the first video content and second video content are either hard-matching pairs or soft-matching pairs until a next sequential pair of video segments of the first video content and the second video content is determined to be neither a hard-matching pair nor a soft-matching pair;

determining, based on the determination that the next sequential pair is neither a hard-matching pair nor a soft-matching pair, that the next sequential pair of video segments of the first video content and the second video content are associated with a main body of the at least one of the first video content or the second video content.

24. The non-transitory computer-readable medium of claim 23, wherein, for each hard-matching pair of video segments of the sequential pairs of video segments, video fingerprints associated with the hard-matching pair of video segments match.

25. The non-transitory computer-readable medium of claim 23, wherein, for each soft-matching pair of video segments of the sequential pairs of video segments, video fingerprints associated with the soft-matching pair of video segments do not match.

26. The non-transitory computer-readable medium of claim 23, wherein the first video content comprises target video content in which the introduction portion is not known, and the second video content comprises reference video content in which the introduction portion is known.

27. The non-transitory computer-readable medium of claim 23, wherein for each hard-matching pair of video segments the sequential pairs of video segments, a difference between lengths of the hard-matching pair of video segments satisfies a length threshold.

28. The non-transitory computer-readable medium of claim 23, wherein for each soft-matching pair of video segments the sequential pairs of video segments, a difference between lengths of the soft-matching pair of video segments does not satisfy a length threshold.

29. A device comprising:
one or more processors; and
memory storing instructions that, when executed by the one or more processors, cause the device to:
determine that one or more hard-matching pairs of video segments of a first video content and a second video content are associated with an introduction portion of at least one of the first video content or the second video content;
determine, based on a machine learning model, one or more soft-matching pairs of video segments of the first video content and the second video content that are associated with the introduction portion of the at least one of the first video content or the second video content;
determine, based on the machine learning model, that a pair of video segments of the first video content and the second video content following a contiguous sequence of the one or more hard-matching and the one or more soft-matching pairs of video segments are neither a hard-matching pair of video segments nor a soft-matching pair of video segments; and
determine, based on the determination that the pair of video segments of the first video content and the second video content is neither a hard-matching pair of video segments nor a soft-matching pair of video segments, that the pair of video segments of the first video content and the second video content are associated with a main body of video content of the at least one of the first video content or the second video content.

30. The device of claim 29, wherein, for each hard-matching pair of video segments of the one or more hard-matching pairs of video segments, video fingerprints associated with the hard-matching pair of video segments match.

31. The device of claim 29, wherein, for each soft-matching pair of video segments of the one or more soft-matching pairs of video segments, video fingerprints associated with the soft-matching pair of video segments do not match.

32. The device of claim 29, wherein the one or more soft-matching pair of video segments comprises a transition from a first part of the introduction portion of the at least one of the first video content or the second video content to the main body of video content of the at least one of the first video content or the second video content.

33. The device of claim 29, wherein the first video content comprises target video content in which the introduction portion is not known, and the second video content comprises reference video content in which the introduction portion is known.

34. The device of claim 29, wherein for each hard-matching pair of video segments of the one or more hard-matching pairs of video segments, a difference between lengths of the hard-matching pair of video segments satisfies a length threshold.

35. The device of claim 29, wherein for each soft-matching pair of video segments of the one or more soft-matching pairs of video segments, a difference between lengths of the soft-matching pair of video segments does not satisfy a length threshold.

36. A device comprising:
one or more processors; and
memory storing instructions that, when executed by the one or more processors, cause the device to:
determine, based on a machine learning model, that sequential pairs of video segments of a first video content and a second video content that follow contiguous hard-matching pairs of video segments of the first video content and second video content are either hard-matching pairs or soft-matching pairs until a next sequential pair of video segments of the first video content and the second video content is determined to be neither a hard-matching pair nor a soft-matching pair;
determine, based on the determination that the next sequential pair is neither a hard-matching pair nor a soft-matching pair, that the next sequential pair of video segments of the first video content and the second video content are associated with a main body of the at least one of the first video content or the second video content.

37. The device of claim 36, wherein, for each hard-matching pair of video segments of the sequential pairs of video segments, video fingerprints associated with the hard-matching pair of video segments match.

38. The device of claim 36, wherein, for each soft-matching pair of video segments of the sequential pairs of video segments, video fingerprints associated with the soft-matching pair of video segments do not match.

39. The device of claim 36, wherein the first video content comprises target video content in which the introduction portion is not known, and the second video content comprises reference video content in which the introduction portion is known.

40. The device of claim 36, wherein for each hard-matching pair of video segments the sequential pairs of video segments, a difference between lengths of the hard-matching pair of video segments satisfies a length threshold.

41. The device of claim 36, wherein for each soft-matching pair of video segments the sequential pairs of video segments, a difference between lengths of the soft-matching pair of video segments does not satisfy a length threshold.

* * * * *